UNITED STATES PATENT OFFICE.

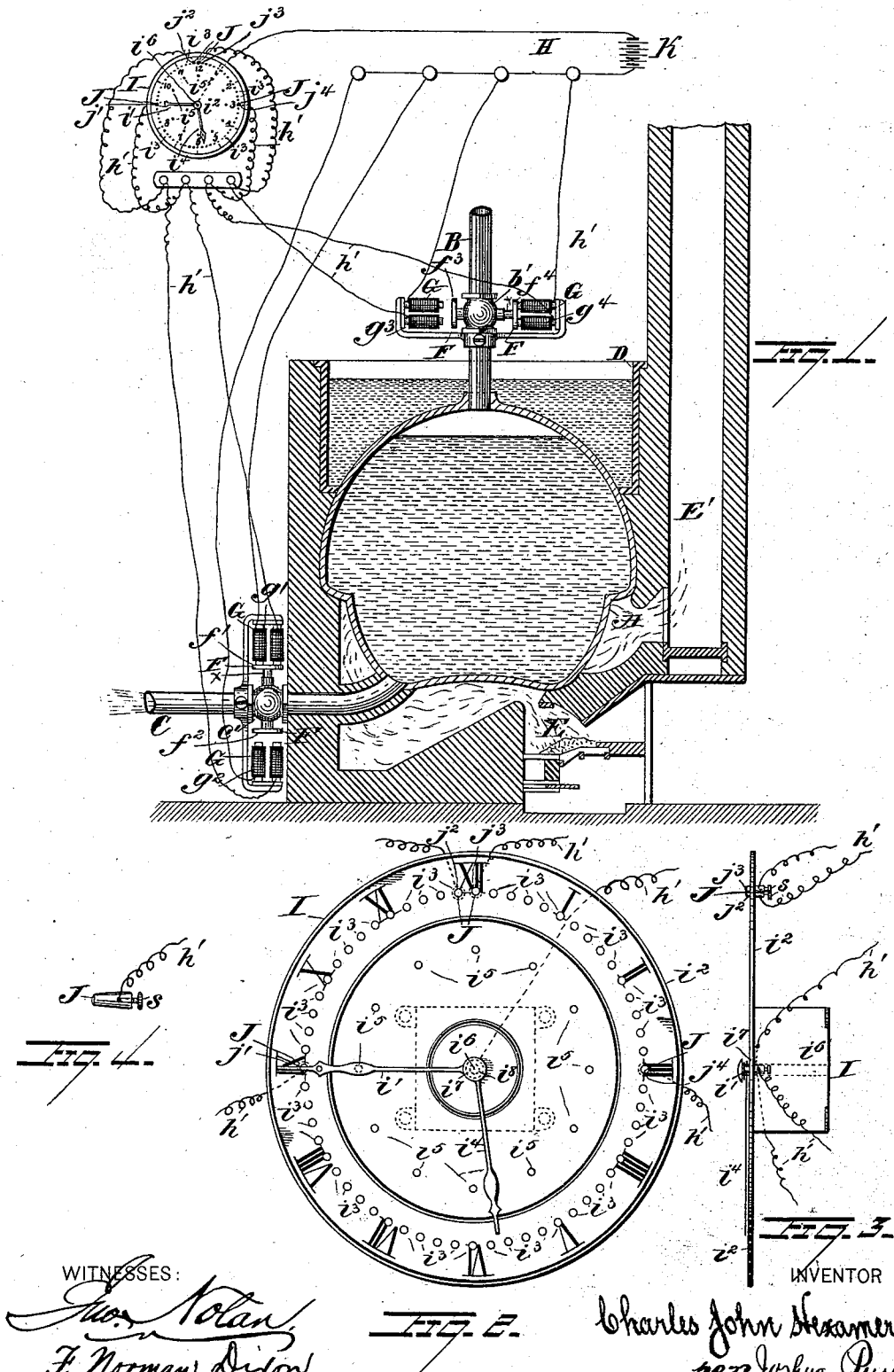

CHARLES JOHN HEXAMER, OF PHILADELPHIA, PENNSYLVANIA.

AUTOMATIC ELECTRIC VALVE.

SPECIFICATION forming part of Letters Patent No. 376,651, dated January 17, 1888.

Application filed October 4, 1887. Serial No. 251,392. (No model.)

*To all whom it may concern:*

Be it known that I, CHARLES JOHN HEXAMER, a citizen of the United States, residing at the city and county of Philadelphia, and State of Pennsylvania, have invented certain new and useful Improvements in Devices for Automatically Regulating the Flow of Liquids to and from Vessels, of which the following is a full, clear, and exact description, reference being had to the accompanying drawings, of which—

Figure 1 is a transverse vertical section of a hop and wort boiler having my invention applied thereto. Fig. 2 is a face view, enlarged, of the clock for closing and breaking the electric circuit. Fig. 3 is an edge view thereof. Fig. 4 is a view of a contact-pin detached.

The nature of this invention is a clock system for automatically regulating the flow of liquids to and from brewing-vats, boilers, cisterns, and other like vessels, whereby the boiling, mixing, or cooling of liquid materials may be safely carried on without necessitating the care and attention of attendants.

The invention, broadly considered, consists in the combination, with a vessel—such as a boiler—the supply and discharge pipes thereof, and the valves on said pipes, of mechanism, controlled by suitable clock-work, for automatically opening and closing said valves at predetermined intervals, in order to allow the discharge from the vessel of the liquid contents thereof when boiled or otherwise suitably acted upon, and the subsequent delivery into said vessel of liquid to be so acted upon.

The invention consists, also, in the combination, with said vessel and the supply and discharge pipes thereof, of electrically-controlled valves on said pipes, an electric circuit, and a clock or clocks adapted to periodically close and break said circuit in order to open and close said valves, as hereinafter set forth.

The invention consists, also, in the combination, with a clock for periodically closing and breaking an electric circuit, of the clock-dial provided with a hole or series of holes in the path of the hand or hands, a pin or pins connected with one end of the electric circuit and adapted to be inserted in said hole or holes, the other end of the circuit being connected with said hands, whereby either of the latter, as desired, will in its rotation come into contact with said pin or pins, and thus complete the circuit.

The invention consists, also, in certain details of construction, which will be hereinafter pointed out.

Referring to the annexed drawings, A represents an ordinary wort and hop boiler used in brewing; B and C, the supply and discharge pipes thereof, respectively; D, the usual water-heating tank, located above the boiler, for the purpose of economizing the heat; E, the furnace, and E' the flue.

The pipes B C are provided with valves $b'$ $c'$, respectively, which have each secured to the ends of their stems $x$ the armatures F of adjacent electro-magnets G. The circuit-wires H, with which these magnets are connected, are normally broken at a clock or regulator, I, which is so constructed that it may be set to complete the circuit at a certain time, in order that the electric current may be transmitted to either of said magnets G, to open or close the valves $b'$ $c'$ of the pipes B C, respectively, so as to allow the delivery into or discharge from the vessel of liquid material, as hereinafter described.

Although clocks of other constructions may be employed to periodically break and close the electric circuit, I have particularly devised for this purpose, and prefer, a clock of the following construction:

Around the path of the minute-hand $i'$, near the edge of the dial $i^2$, is a series of equidistant holes, $i^3$, preferably sixty in number, representing sixty minutes, and below these holes, in the path of the hour-hand $i^4$, is another series of like holes, $i^5$, usually twelve in number, representing twelve hours. Adapted to be inserted in these holes $i^3$ $i^5$ are pins J, to which are attached, by means of binding-screws $s$ or otherwise, the ends of the circuit-wires $h'$, leading to the magnets G, with which magnets the said pins correspond in number. The end of the main circuit H, with which the wires $h'$ are connected, is in contact with the arbor $i^6$ of the hands $i'$ $i^4$. Now it will be seen that by inserting the pins J in the holes $i^3$ or $i^5$, at intervals apart, the minute-hand or hour-hand will in its rotation come gently into contact with and ride over the same, and thus complete and break the circuit successively, thereby transmitting the electric current generated in the battery K to the magnets G, which will likewise open and close the valves $b'$ $c'$.

The pins J are so inserted in the holes $i^3$ $i^5$ that the hands will come into contact with them (the pins) at predetermined intervals, in order to open and close the respective valves in proper succession—that is to say, when the time necessary for the liquid to have been properly boiled, &c., has elapsed, one of the hands—say the minute-hand—will come into contact with the pin $j'$ and complete the electric circuit with the magnet $g'$, which will attract thereto the adjacent armature $f'$ on the stem of valve $c'$ of the discharge-pipe C, and thereby open said valve and allow the prepared liquid to escape. After a sufficient interval—say fourteen minutes—necessary for the escape of said liquid, the hand will come into contact with the pin $j^2$ and complete the circuit with the magnet $g^2$, which will attract thereto the other armature, $f^2$, on said stem of valve $c'$, and thus close the latter. The hand $i'$ will immediately thereafter come into contact with the pin $j^3$ and complete the circuit with the magnet $g^3$, which will attract thereto the adjacent armature $f^3$ on the stem of valve $b'$ of the supply-pipe B, and thereby open said valve and allow the liquid to flow into the vessel A. After the predetermined time necessary for the proper preparation of the liquid has elapsed, the hand $i'$ will come into contact with the pin $j^4$ and complete the circuit with the magnet $g^4$, which will likewise attract thereto the other armature, $f^4$, on the stem of valve $b'$ and close the latter. The liquid is now boiled, mixed, or otherwise acted upon until the hand again comes into contact with the pin $j'$, when the operations just described will be repeated. Of course the pins J are removed and properly reinserted as occasion may require.

If an interval of an hour or more be required between the opening and closing of either of the valves $b'$ $c'$, the pins J are inserted in the hour-holes $i^5$.

When the dial-plate $i^2$ is made of metal or other electric conductor, I insulate the arbor therefrom by inserting a rubber ring, $i^7$, or other like non-conducting material, in the central hole, $i^8$, and cover the pins J with a suitable insulating material; or, instead of thus covering these pins, I sometimes insert rings of rubber or like material in the holes $i^3$ $i^5$, which effect the same purpose.

I do not restrict myself to the special devices above described for periodically opening and closing the valves of the supply and discharge pipes of boilers, &c., as the clock may be set to automatically trip mechanical devices for the same purpose. Nor, when I use electrically-controlled devices, do I confine myself to a circuit-completing clock of the precise construction shown and described, as the clock may be variously modified without departing from my invention.

Having thus described my invention, I claim as new and wish to secure by Letters Patent—

1. The combination, with a vessel—such as a boiler—and the supply and discharge pipes thereof, of electrically-controlled valves on said pipes, an electric circuit, and a clock or clocks adapted to periodically close and break said circuit in order to open and close said valves successively, substantially as and for the purpose set forth.

2. The combination, with a vessel—such as a boiler—and the supply and discharge pipes thereof, of the valves on said pipes, the armatures secured to the valve-stems, the magnets adjacent to said armatures, the electric circuit with which said magnets are connected, and the clock or clocks adapted to periodically close and break said circuit, substantially as and for the purpose set forth.

3. The combination, with a vessel—such as a boiler—the supply and discharge pipes thereof, the valves on said pipes, the valve-stems, the armatures on the ends of said valve-stems, respectively, the magnets adjacent to said armatures, and the electric circuit connected with said magnets, of the clock or regulator for successively breaking and completing the circuit with said magnets at predetermined intervals, the dial-plate of said clock, a hole or series of holes in said dial-plate in the path of the hand or hands of said clock, the pins connected with the circuit-wires leading from each of said magnets and adapted to be inserted in said hole or holes, the other end of the circuit being connected with said hands, whereby either of the latter, as desired, will in its rotation come into contact with and ride over said pin or pins, and thus complete and break the circuit with said magnets in succession, all combined, constructed, and adapted to operate substantially as and for the purpose specified.

In testimony whereof I have hereunto affixed my signature this 27th day of September, A. D. 1887.

CHARLES JOHN HEXAMER.

Witnesses:
 JNO. NOLAN,
 GEO. W. REED.